United States Patent
Garabello et al.

(10) Patent No.: US 8,910,770 B2
(45) Date of Patent: Dec. 16, 2014

(54) GEAR CHANGE DEVICE FOR MOTOR-VEHICLES

(71) Applicant: C.R.F. Societa Consortile per Azioni, Orbassano (Torino) (IT)

(72) Inventors: Marco Garabello, Orbassano (IT); Gianluigi Pregnolato, Orbassano (IT); Valter Pastorello, Orbassano (IT); Andrea Piazza, Orbassano (IT)

(73) Assignee: C.R.F. Societá Consortile per Azioni, Orbassano (Torino) (IT)

( * ) Notice: Subject to any disclaimer, the term of this patent is extended or adjusted under 35 U.S.C. 154(b) by 136 days.

(21) Appl. No.: 13/737,371

(22) Filed: Jan. 9, 2013

(65) Prior Publication Data
US 2014/0076079 A1    Mar. 20, 2014

(30) Foreign Application Priority Data

Sep. 20, 2012 (EP) .................................... 12185134

(51) Int. Cl.
| | |
|---|---|
| *F16H 3/089* | (2006.01) |
| *F16H 63/34* | (2006.01) |
| *F16H 3/08* | (2006.01) |
| *F16F 3/12* | (2006.01) |
| *F16H 63/30* | (2006.01) |
| *F16H 3/12* | (2006.01) |
| *F16H 61/04* | (2006.01) |

(52) U.S. Cl.
CPC .. *F16H 3/08* (2013.01); *F16F 3/12* (2013.01); *F16H 63/302* (2013.01); *F16H 3/089* (2013.01); *F16H 2003/123* (2013.01); *F16H 2061/0411* (2013.01)
USPC .......................................... 192/219; 192/222

(58) Field of Classification Search
CPC ........................... F16H 63/345; F16H 63/3458
USPC .......................................................... 192/53.2
See application file for complete search history.

(56) References Cited

U.S. PATENT DOCUMENTS 2,252,042 A * 8/1941 Sinclair .......................... 192/219
3,645,367 A * 2/1972 Coleman et al. ............... 192/219

(Continued)

FOREIGN PATENT DOCUMENTS

| GB | 2 335 010 A | 9/1999 |
|---|---|---|
| IT | TO 940 711 A1 | 3/1996 |

(Continued)

OTHER PUBLICATIONS

European Search Report (EP Form 1507N) dated Dec. 4, 2012, and competed on Nov. 28, 2012, for corresponding European application No. EP12185134.9, filed on Sep. 20, 2012.

*Primary Examiner* — Rodney H Bonck
(74) *Attorney, Agent, or Firm* — Heslin Rothenberg Farley & Mesiti P.C.; Victor A. Cardona, Esq.

(57) ABSTRACT

A gear change device for a motor vehicle has a braking member for stopping a rotation of a primary shaft before engagement of a reverse gear. The braking member includes a lever pivotally mounted on a gearbox about a separate axis with respect to axes of the primary and secondary shafts of the gear change device. The braking lever is controlled by an electrically-driven actuator by a pusher member displaceable by the actuator in a direction substantially tangential with respect to the primary shaft, towards an operative position in which it interposes with a wedge-like action between the braking lever and a fixed abutment wall, so as to press the brake pad against a cooperating part which is connected in rotation with the primary shaft.

9 Claims, 8 Drawing Sheets

(56) References Cited

U.S. PATENT DOCUMENTS

| | | | | |
|---|---|---|---|---|
| 3,834,499 | A | * | 9/1974 | Candellero et al. ............ 192/222 |
| 4,360,092 | A | * | 11/1982 | Muller et al. ................ 192/13 R |
| 6,588,294 | B1 | * | 7/2003 | Rogg ......................... 192/219.5 |
| 8,146,728 | B2 | * | 4/2012 | Reichert ..................... 192/219.5 |
| 2011/0036187 | A1 | * | 2/2011 | Reisch et al. ................. 74/411.5 |
| 2011/0290615 | A1 | * | 12/2011 | Schwekutsch et al. .... 192/219.5 |

FOREIGN PATENT DOCUMENTS

| | | |
|---|---|---|
| JP | 63 095931 U | 6/1988 |
| JP | 2 212675 A | 8/1990 |
| JP | 10 159973 A | 6/1998 |

* cited by examiner

GEAR CHANGE DEVICE FOR MOTOR-VEHICLES

CROSS REFERENCE TO RELATED APPLICATIONS

This application claims priority from European Patent Application No. 12185134.9 filed on Sep. 20, 2012, the entire disclosure of which is incorporated herein by reference.

FIELD OF THE INVENTION

The present invention relates to a gear change device for a motor vehicle, of the type comprising:
- at least one primary shaft, connectable to the driving shaft of the motor vehicle by means of a clutch device
- at least one secondary shaft, having an output pinion designed for meshing with the gear wheel of a differential
- a plurality of pairs of gear wheels corresponding to a plurality of forward gears and at least one reverse gear, wherein one gear wheel of each pair is rigidly connected in rotation with one of said primary or secondary shafts, whilst the other is freely rotatable on the other of said primary or secondary shafts,
- a plurality of gear selector devices for coupling in rotation each of said freely rotatable wheels of the shaft on which it is mounted, said device also comprising:
- a braking member to stop the rotation of said first primary shaft before engagement of the first gear, said braking member comprising a lever pivotally mounted on an axis parallel to the axis of the primary shaft, and carrying a braking pad configured to make contact with the surface of a cooperating part that is connected in rotation with the primary shaft, and
- control means for pushing said lever towards a braking position wherein said braking pad makes contact with the surface of said cooperating part.

A gear change device having the features indicated above is known from the document IT 1 267 446 B1. In this known device, the braking lever is pivotally mounted above the secondary shaft of the gears and is controlled by means of a mechanical transmission connected to the drive lever of the gears that is manually controlled by the driver.

OBJECT OF THE INVENTION

The object of the present invention is to provide a device having the characteristics indicated at the beginning of the present description which has a simple structure and a low cost, and which can be easily adapted even on a gear change device originally designed without a braking device of this type.

A further object of the invention is to provide a device that is reduced in dimensions and efficient and reliable in operation.

SUMMARY OF THE INVENTION

In view of achieving these objects, the invention relates to a gear change device for motor vehicles having all the characteristics that have been indicated at the beginning of the present description and further characterized in that said braking lever is pivotally mounted on the support structure of the gear change device about an separate axis with respect to the axes of said primary and secondary shafts, and in that said actuating means comprise:
- an electrically-driven actuator, and
- a pusher member which is displaceable by means of said electrically-driven actuator according to an substantially tangential direction with respect to the primary shaft, towards an operative position in which it interposes with a wedge action between the braking lever and a fixed abutment wall, so as to press the brake pad against said part cooperating with it.

The electrically-driven actuator is preferably an electromagnet which is automatically driven for a predetermined time by the electronic control unit when it detects the intention of the driver to shift into reverse gear. This can be achieved by means of a sensor associated with the drive lever of the gears or the gears itself, configured to detect when a preparatory maneuver is carried out for engagement of the reverse gear (for example the alignment of the control lever with the engagement position of the reverse gear, or the lifting of the ring which in some applications is mounted on the gear control lever to enable the engagement of the reverse gear). Where possible, the sensor means configured to enable activation of the brake lever actuator are the same as those already arranged on the motor vehicle for activation of the switching on of the reversing lights.

According to a further characteristic of the preferred embodiment of the present invention, the aforesaid braking lever is arranged with its end carrying the braking pad circumferentially located downstream of the axis of oscillation of the lever, with reference to the direction of rotation of the primary shaft of the gears. Consequently, the direction of rotation of the braking lever in the activation phase is concordant with the direction of rotation of the primary shaft, which facilitates the activation of the braking lever.

BRIEF DESCRIPTION OF THE DRAWINGS

Further characteristics and advantages of the present invention will be apparent from the description which follows with reference to the attached drawings, provided purely by way of non-limiting example, wherein.

DETAILED DESCRIPTION OF THE INVENTION

Figure 1:
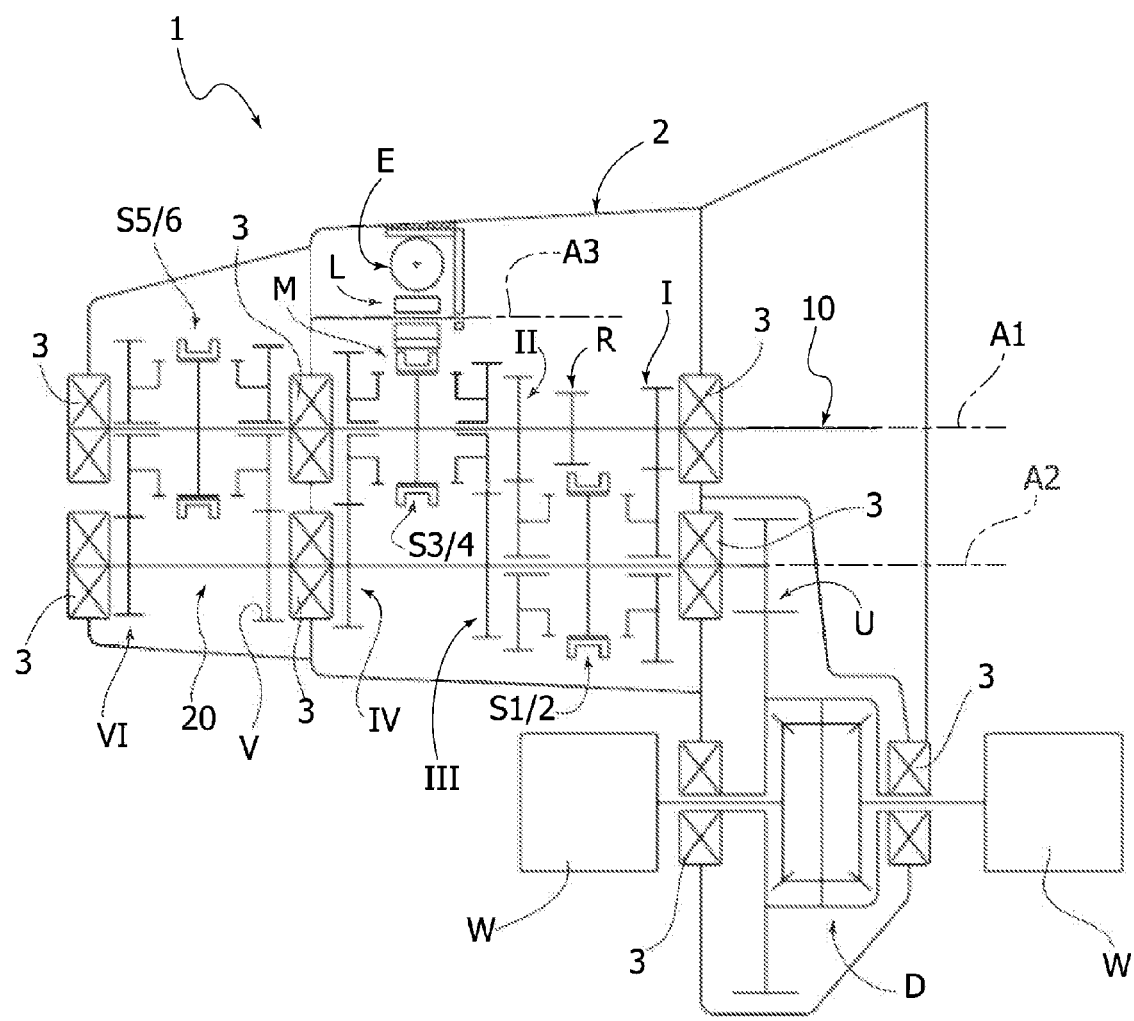
FIG. 1 is a diagram of an example of an embodiment of a gear change device for a motor vehicle, to which the present invention is applicable.
Figure 2A:
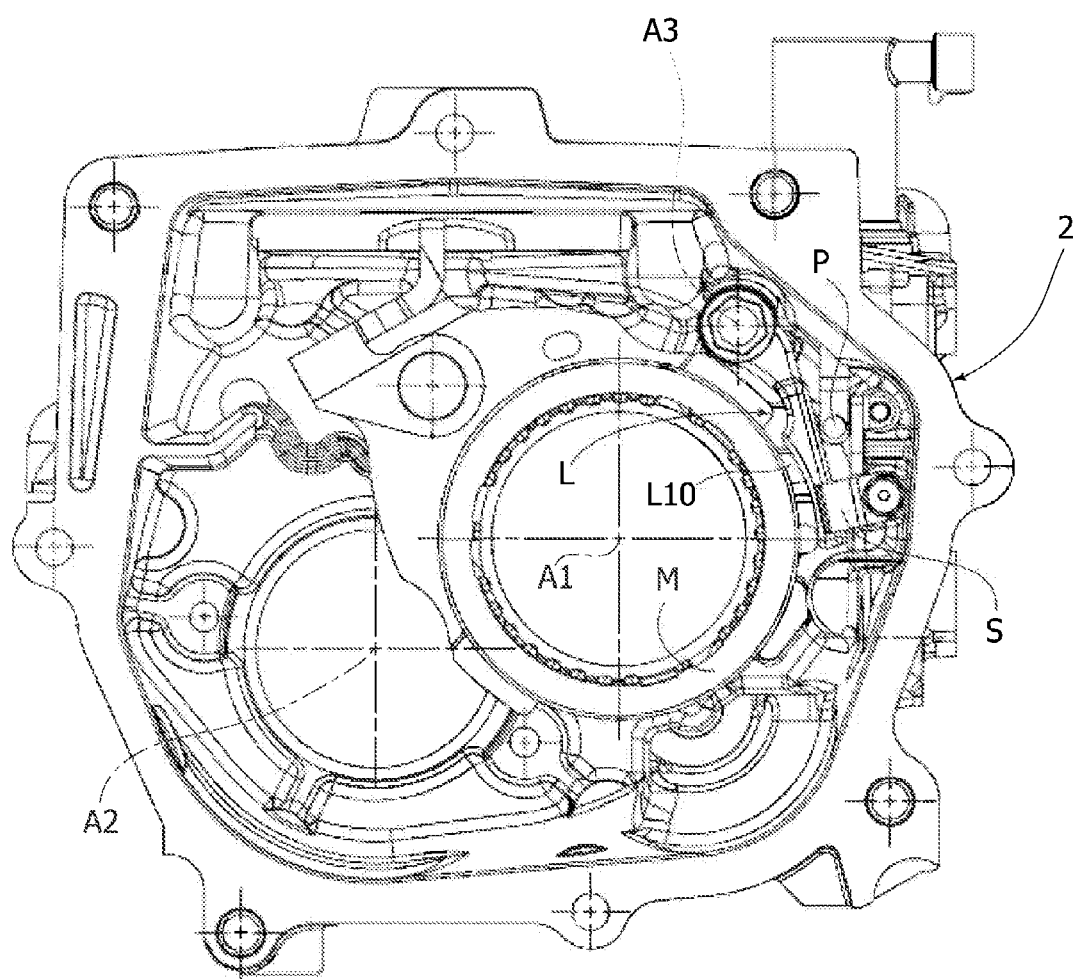
FIG. 2A is a sectional view of a concrete form of an embodiment of the device of FIG. 1.
Figure 2B:
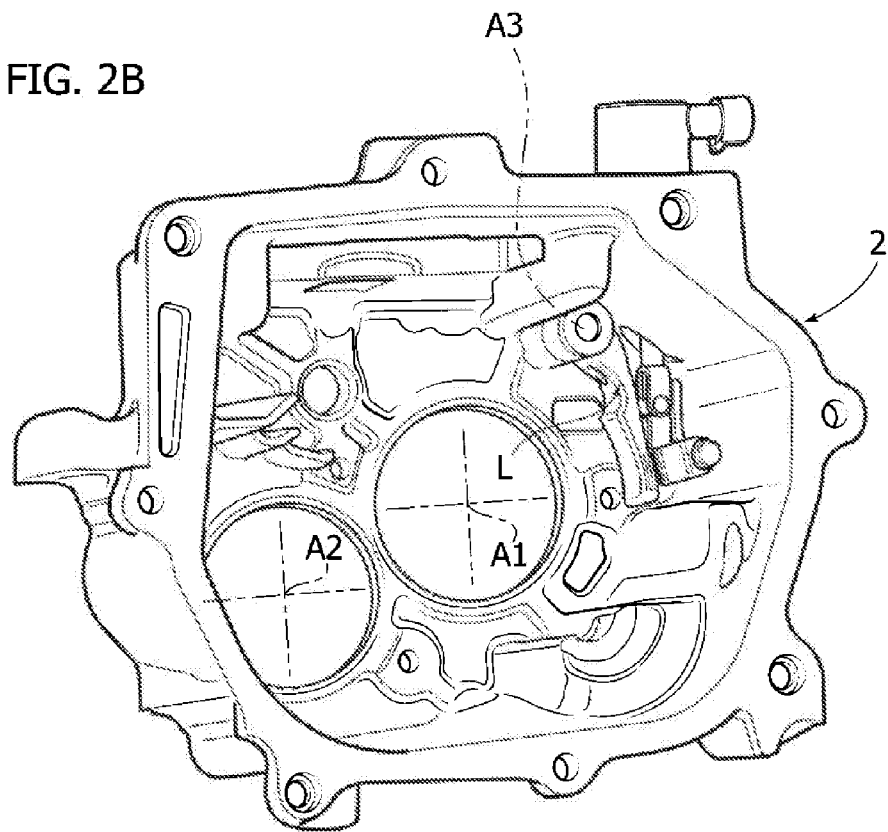
FIG. 2B is a perspective sectional view of the inside of the gearbox of FIG. 2A with the braking lever mounted inside it.

With reference to FIG. 1, the number 1 indicates as a whole an example of gears to which the present invention is applicable. The figure shows gears of the conventional type, with a single primary shaft 10 and a single secondary shaft 20, but it is evident that the invention is also applicable to any other type of transversal type gears with two or more secondary shafts and any longitudinal type gears having primary shafts connected to one or more countershafts and with the secondary shaft being coaxial to the axis of the combustion engine.

According to the conventional art, the primary shaft 10 and the secondary shaft 20 (whose axes are indicated by A1 and A2) are rotatably mounted in a gearbox 2 by means of roller bearings 3. In FIG. 1 the clutch device for connecting the primary shaft 10 to the drive shaft of the motor vehicle is not visible. The secondary shaft 20 carries an output pinion U meshing with the crown wheel of a differential D which transmits the motion to the wheels W.

Still according to the conventional art, the gears comprise a plurality of pairs of gear wheels corresponding to a plurality of forward gears and at least one reverse gear, wherein the wheels of each pair are each rigidly connected in rotation with one of said primary and secondary shafts, while the other is freely rotatable on the other of said primary and secondary shafts. In the case of the illustrated example, the wheel I for the first gear, the wheel II for the second gear, the wheel V for the fifth gear and the wheel VI for the sixth gear are connected in rotation to the primary shaft 10 and mesh with freely rotatably mounted wheels on the secondary shaft 20. The wheels III and IV for the third and fourth gears are connected in rotation to the secondary shaft 20 and mesh with freely rotatably mounted wheels on the main shaft 10. According to the conventional art, synchronizer devices for gear selection are provided, for coupling in rotation each of said freely rotatable wheels with the shaft on which it is mounted. In the example shown a selection device S1/2 associated with the secondary shaft 20 enables the selection of the first and second gear, while selector devices S3/4 and S5/6 associated with the primary shaft 10 enable the selection of the third gear and fourth gear as well as the fifth gear and sixth gear.

The primary shaft 10 is also associated with a wheel R for engagement of the reverse gear that meshes with a wheel (not shown) rotatably mounted on a third shaft (not shown) of the gears, which is associated with a selection device (not visible in the drawings) having no synchronizing capability, so that the engagement of the reverse gear may be noisy if the primary shaft 10 is rotating.

In order to resolve this problem, the gears according to the invention are equipped with a device for braking the rotation of the primary shaft 10 which intervenes prior to engagement of the reverse gear.

The device according to the invention comprises a braking lever L pivotally mounted directly inside the gearbox 2 of the device about an axis A3 parallel to axes A1, A2 of the primary shaft and the secondary shaft of the gear change device. The lever L has one end L1 defining a braking pad with a concave surface L10 having a high coefficient of friction, designed to come into contact with the outer surface M1 of a sleeve M which is part of the selector device S3/4 of the third and the fourth gear. According to the prior art the sleeve M is connected in rotation with the primary shaft, but is axially slidable relative to it so as to assume an end position for engagement of the third gear, an opposite end position for the engagement of the fourth gear and an intermediate neutral position between these end positions.

Figure 3:
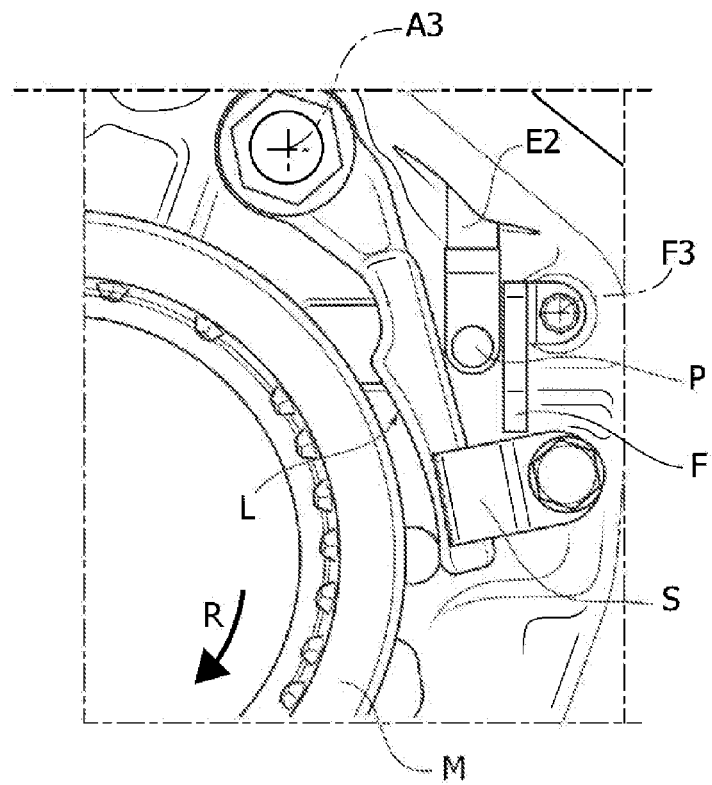
FIGS. 3, 4 are front views of the braking lever respectively in the inactive resting position and in the operative braking position.
Figure 4:
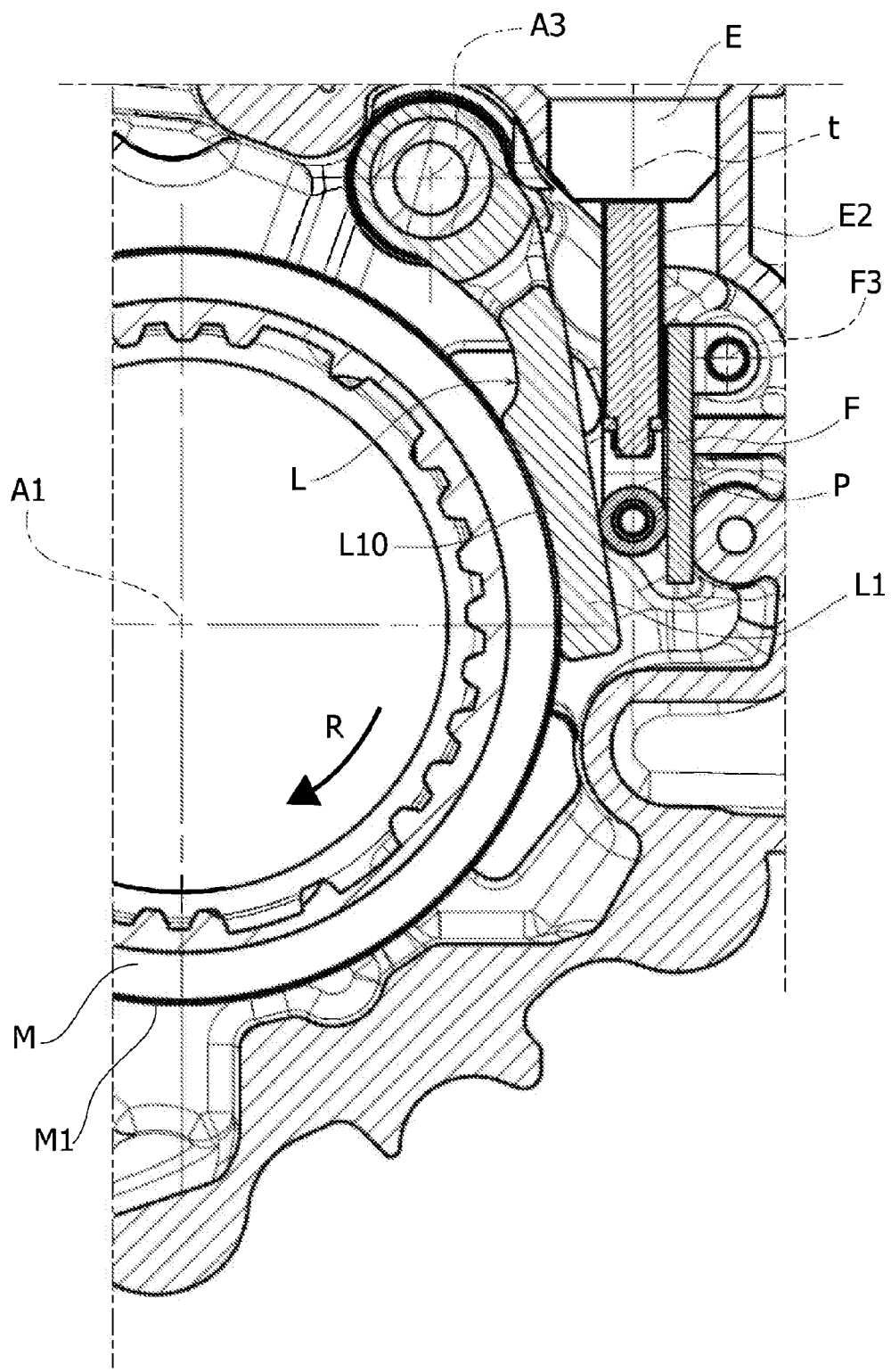
Figure 5:
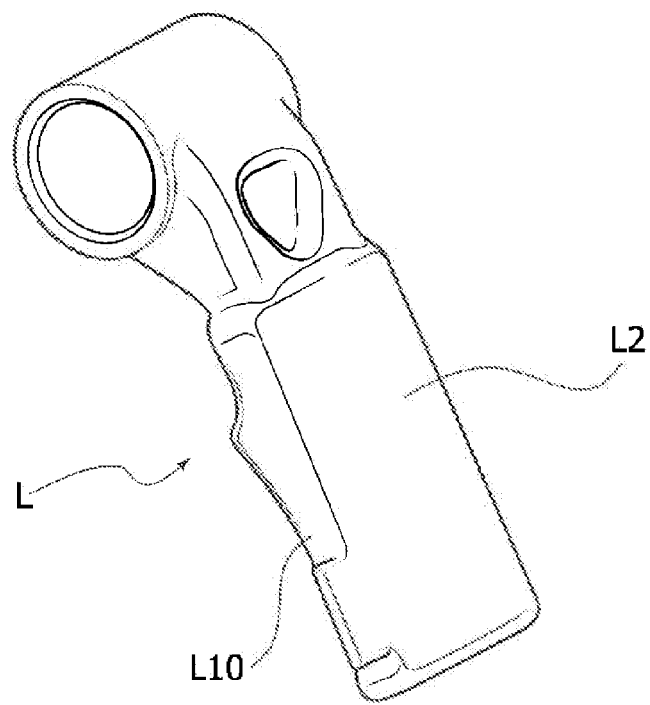
FIG. 5 is a perspective view of an example of an embodiment of the braking lever.

With reference to FIGS. 3, 4, the direction of rotation R of the primary shaft is clockwise. As can be seen, the braking lever L is arranged in such a way so that its end L1 acting as a braking pad is located downstream with respect to the axis of oscillation A3, with reference to the direction of rotation R of the primary shaft. Thanks to this arrangement, the direction of the oscillation of the lever L when it is pushed into the braking position is concordant with the direction of rotation R of the primary shaft, which facilitates activation of the braking lever.

The braking surface L10 can be produced in a single piece with the lever L, in which case the latter is made of any suitable material, or it can be defined by a coating achieved, for example, by spraying onto the body of the lever L.

The braking lever L is pushed from an inoperative resting position (FIG. 3) to its active braking position by means of a pusher member P which is displaceable by means of an electromagnetic actuator E according to an substantially tangential direction t with respect to the primary shaft 10.

Figure 9:
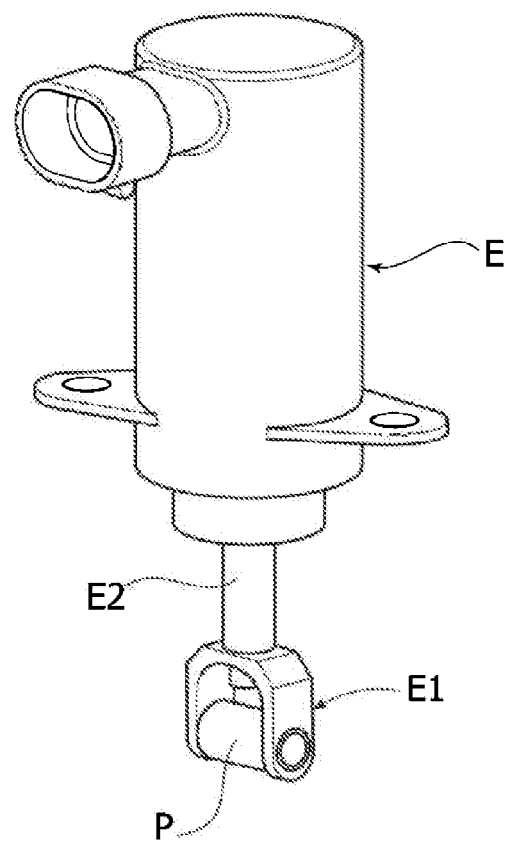
FIG. 9 is a perspective view of an electromagnet used as an actuator of the braking lever.
Figure 10:
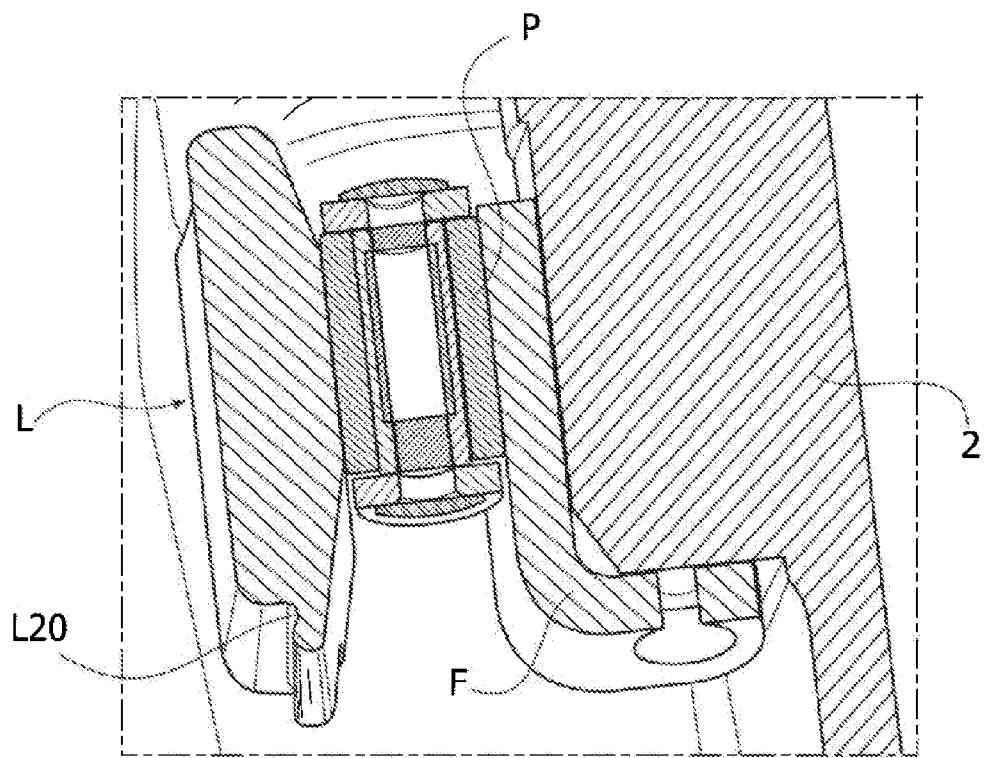
FIG. 10 is a sectional view showing the interposition of the roller controlled by the electromagnetic actuator between the braking lever and the stop plate.

In the case of the example illustrated the pusher member is constituted by a freely rotatable roller mounted between the branches of a forked end E1 of a rod E2 controlled by the electromagnetic actuator E (see FIG. 9).

The pusher roller P is interposed with wedge action between a track L2 formed on the outer surface of the lever L and a steel plate F fixed to the gearbox.

Figure 11:
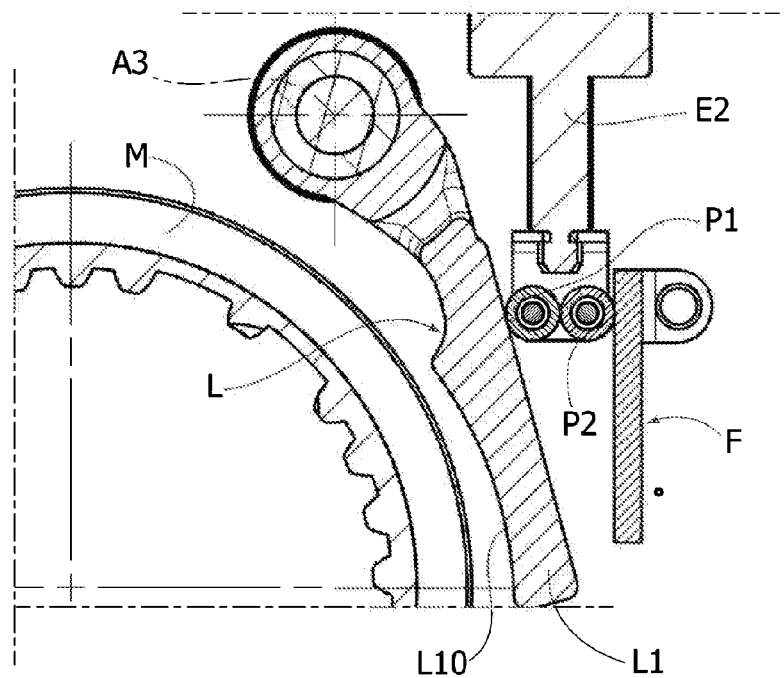
FIGS. 11, 12 are views corresponding to those of FIGS. 3, 4 which refer to a variant.
Figure 12:
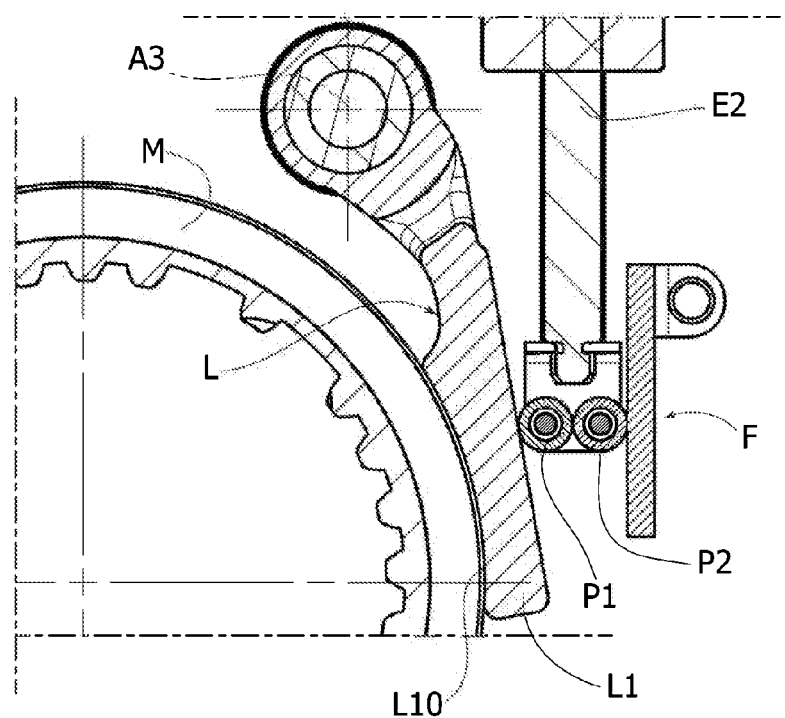

To further reduce friction the pusher member can be constituted by two roller agents P1 and P2, one in contact with the lever L and the other with the plate F, respectively (FIGS. 11, 12).

Figure 6:
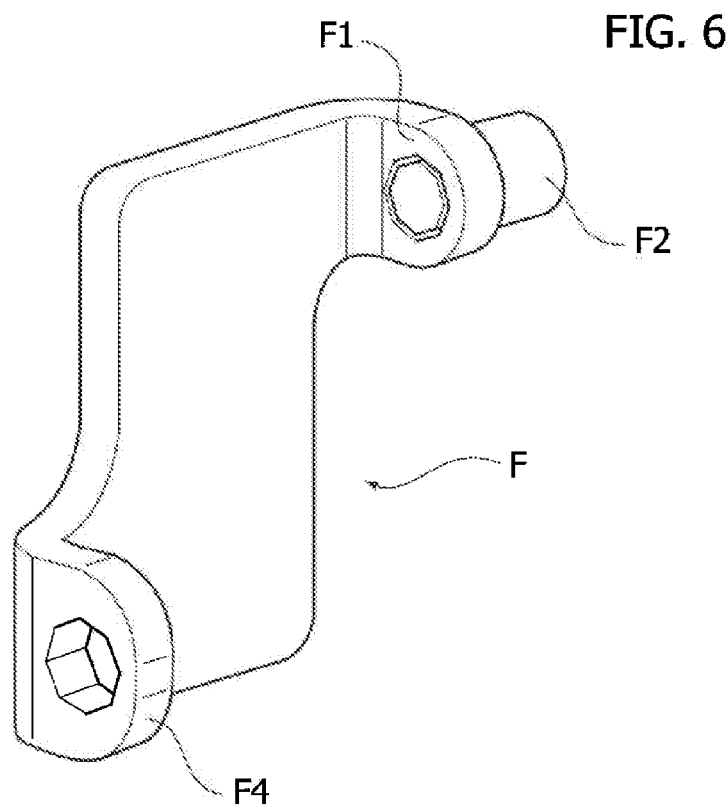
FIG. 6 is a perspective view of a stop plate used in the device according to the invention.
Figure 7:
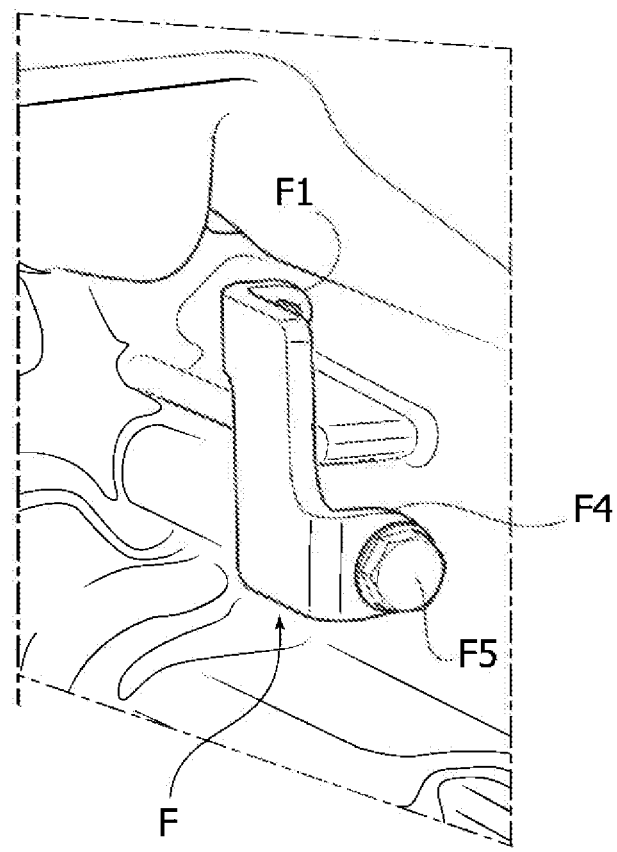
FIG. 7 illustrates the plate of FIG. 6 in the assembled condition.
Figure 8:
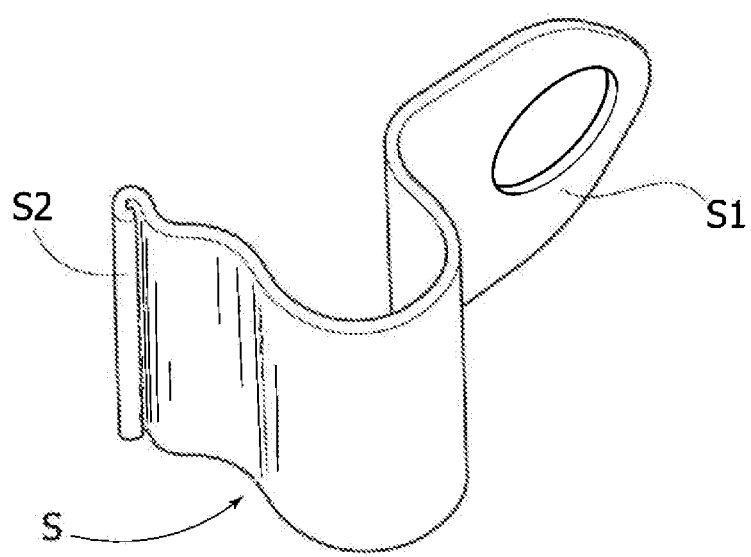
FIG. 8 is a perspective view of a return spring associated with the braking lever.

In the case of the example illustrated (see FIGS. 6, 7) the plate F that acts as an abutment for the pusher member P (or P1, P2) presents an ear F1 with a pin F2 for pivotal mounting on the gearbox about an axis F3 (sec FIGS. 3, 4). Again with reference to FIGS. 6, 7, the plate F also has another ear F4 at its opposite end for the engagement of a screw F5 which is screwed into a hole of the gearbox in order to lock the plate F in position with respect to the gearbox.

A return spring S is also associated with the lever L, tending to return the lever L toward its inoperative resting position. In the case of the example of the embodiment illustrated herein, the return spring S is constituted by a metallic strip having one end S1 anchored to the gearbox by means of the same screw F5 that locks the plate F. The opposite end of the spring S has a folded edge S2 which engages in a seat L20 of the lever L.

With reference to FIG. 4, when the electromagnet E is activated, the rod E2 pushes the roller P downwards between the lever L and the plate F, which have flat surfaces facing each other and converging towards each other. Therefore, it produces a wedge action of the roller P that pushes the pad L1 against the surface M1 of the sleeve M connected in rotation with the primary shaft. The primary shaft is thus rapidly brought to a halt, provided that it is still rotating.

When the electromagnet E is de-energized, the return spring S is envisaged to return the lever L to its inoperative resting position.

In the example illustrated here, the electromagnet E is arranged to be automatically activated by the electronic control unit when it receives a signal indicative of the intention of the driver to shift into reverse gear. This signal may be generated by a sensor arranged to detect when the control lever of the gears that is maneuvered by the driver is brought into a preliminary position of engagement of the reverse gear (i.e., when the lever is aligned at the position of engagement of the reverse gear or, in cases in which such a solution is provided, when a slidably mounted ring on the control lever of the gears is raised to enable engagement of the reverse gear). Where possible, detecting the intention of shifting into reverse gear by the driver is executed by using the already arranged sensor means for activation of the switching on of the reversing lights.

In place of the electromagnetic actuator it is possible to provide any other type of electrically-driven actuator, such as, for example, an electric motor associated with a reductor group and a screw-and-nut system, or even an actuator including an element consisting of a memory alloy of the form which is heated and contracts when electric current runs through it.

It is also possible to provide, as in the case of the illustrated example, a single-acting electric actuator, with a return spring to return the braking lever to its resting position at the end of activation, or alternatively a double-acting electric actuator may be provided that controls the movement of the braking lever both in the activation phase, and in the deactivation phase.

As is evident from the above description, the device according to the invention has a simple structure, is of low cost and non-bulky, which can also be easily adapted in a gear change device originally designed without any type of braking device.

As can be seen, thanks to the device according to the invention, it is possible to guarantee the correct gear engagement in a simple way, without noise of engagement of the reverse gear, including gears in which the selection device of the reverse gear is devoid of synchronizing means.

Of course, without prejudice to the principle of the invention, the details of construction and the embodiments may vary widely with respect to those described and illustrated purely by way of example, without thereby departing from the scope of the present invention.

What is claimed is:

1. Gear change device for motor vehicles, comprising:
   at least one primary shaft, connectable to the driving shaft of a motor vehicle by a clutch device,
   at least one secondary shaft, having an output pinion for meshing with a gear wheel of a differential,
   a plurality of pairs of gear wheels corresponding to a plurality of forward gears and at least one reverse gear, wherein a first gear wheel of each pair of gear wheels is rigidly connected in rotation with a first shaft of said at least one primary shaft or said at least one secondary shaft while a second gear wheel of each pair of gear wheels is freely rotatable on a second shaft of said at least primary shaft or said at least one secondary shaft; the other of said primary or secondary shafts,
   a plurality of gear selector devices for coupling in rotation each of said freely rotatable wheels with the shaft on which it is mounted,
   said device also comprising:
   a braking member to stop the rotation of said first shaft before engagement of the first gear, said braking member comprising a braking lever pivotally mounted on an axis parallel to the axis of said first shaft and carrying a braking pad configured to make contact with a surface of a cooperating part connected in rotation with said first shaft, and
   control means for pushing said lever towards a braking position wherein said braking pad makes contact with said surface of said cooperating part, said braking lever pivotally mounted on a support structure about a separate axis with respect to the axes of said at least one primary shaft and said at least one secondary shaft and actuating means comprise:
   an electrically-driven actuator, and
   a pusher member movable by said electrically-driven actuator along a substantially tangential direction with respect to the primary shaft, towards an operative position in which said pusher member interposes with a wedge-like action between the braking lever and a fixed abutment wall, so as to press the brake pad against said cooperating part.

2. Device according to claim 1, wherein said braking lever is arranged with one end defining said braking pad downstream of said pivotal axis of oscillation of the braking lever, with reference to the direction of rotation of said primary shaft, so that the oscillation of said braking lever during its activation occurs in a direction concordant with the direction of rotation of the primary shaft.

3. Device according to claim 1, wherein said electrically-driven actuator is an electromagnet operable for pushing a rod, the end of which carries said pusher member, between the cooperating surfaces of said braking lever and a stop plate.

4. Device according to claim 3, wherein said pusher member comprises a freely rotatable roller mounted on the end of the rod.

5. Device according to claim 3, wherein said pusher member comprises two freely rotatable rollers mounted on the end of the rod and configured for engaging said braking lever and said abutment surface, respectively.

6. Device according to claim 1, wherein said electrically-driven actuator is of a single-action type, and that said device further comprises spring means to return the braking lever towards its inoperative resting position.

7. Device according to claim 1, wherein said electric actuator is arranged to be automatically activated for a determined time in response to a detection of the intention of the driver to engage the reverse gear.

8. Device according to claim 7, wherein sensor means are configured to turn on rear lights for indicating a reverse.

9. Device according to claim 1, wherein said braking lever has an end portion defining said braking pad having a concave surface having a curvature corresponding to said surface of the said cooperating part.

* * * * *